(12) United States Patent
Takasaki

(10) Patent No.: US 6,707,841 B1
(45) Date of Patent: Mar. 16, 2004

(54) SPREADING CODE GENERATOR

(75) Inventor: Atsushi Takasaki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/578,903

(22) Filed: May 26, 2000

(30) Foreign Application Priority Data

May 27, 1999 (JP) .......................................... 11-147856

(51) Int. Cl.$^7$ .............................. H04B 1/69; H04B 1/707
(52) U.S. Cl. ........................ 375/130; 375/134; 331/78; 708/251; 708/253; 708/256
(58) Field of Search ................ 375/130; 708/250, 708/251, 252, 253, 254, 255, 256; 331/78

(56) References Cited

U.S. PATENT DOCUMENTS

| | | | |
|---|---|---|---|
| 3,761,696 A | * 9/1973 | Russell | 708/252 |
| 3,963,905 A | * 6/1976 | Gopinath et al. | 708/252 |
| 4,974,184 A | * 11/1990 | Avra | 708/252 |
| 5,537,396 A | 7/1996 | Kanda et al. | 370/18 |
| 6,115,411 A | * 9/2000 | van Driest | 375/130 |
| 6,212,219 B1 | * 4/2001 | Shou et al. | 375/130 |

FOREIGN PATENT DOCUMENTS

| | | |
|---|---|---|
| EP | 0 814 581 | 12/1997 |
| JP | 10-290211 | 10/1998 |

* cited by examiner

Primary Examiner—Don N. Vo
Assistant Examiner—Qutbuddin Ghulamali
(74) Attorney, Agent, or Firm—Fitzpatrick, Cella, Harper & Scinto

(57) ABSTRACT

A spreading code generator generates a spreading code specified by a matrix order and row number, which are matrix elements. The spreading code generator includes a repetitive division circuit for repeatedly dividing a row number by 2 a number of times equivalent to the matrix order; a reference-coefficient storage unit for storing reference coefficients obtained as a result of the repetitive division; a first code-sequence generating unit for generating a first code sequence by repeating inverted extension or non-inverted extension in dependence upon bits up a kth bit of the reference coefficient; a second code-sequence generating unit for generating a second code sequence by repeating inverted extension or non-inverted extension in dependence upon a (k+1)th bit onward of the reference coefficient; first and second shift registers for storing the first and second code sequences, respectively, extended by the first and second code generating units, respectively; and an exclusive-OR circuit for taking the exclusive-OR of the outputs of the first and second registers.

15 Claims, 11 Drawing Sheets

F I G. 2

$$C_0 = C_0(0)$$

$$C_1 = \begin{bmatrix} C_1(0) \\ C_1(1) \end{bmatrix} = \begin{bmatrix} C_0(0) & C_0(0) \\ C_0(0) & \overline{C_0(0)} \end{bmatrix}$$

$$C_2 = \begin{bmatrix} C_2(0) \\ C_2(1) \\ C_2(2) \\ C_2(3) \end{bmatrix} = \begin{bmatrix} C_1(0) & C_1(0) \\ C_1(0) & \overline{C_1(0)} \\ C_1(1) & C_1(1) \\ C_1(1) & \overline{C_1(1)} \end{bmatrix}$$

$$\vdots$$

$$C_n = \begin{bmatrix} C_n(0) \\ \vdots \\ C_n(2^n-1) \end{bmatrix} = \begin{bmatrix} C_{n-1}(0) & C_{n-1}(0) \\ C_{n-1}(0) & \overline{C_{n-1}(0)} \\ \vdots & \vdots \\ C_{n-1}(2^{n-1}-1) & C_{n-1}(2^{n-1}-1) \\ C_{n-1}(2^{n-1}-1) & \overline{C_{n-1}(2^{n-1}-1)} \end{bmatrix}$$

$\overline{C_n}$ INDICATES THE INVERSE OF $C_n$

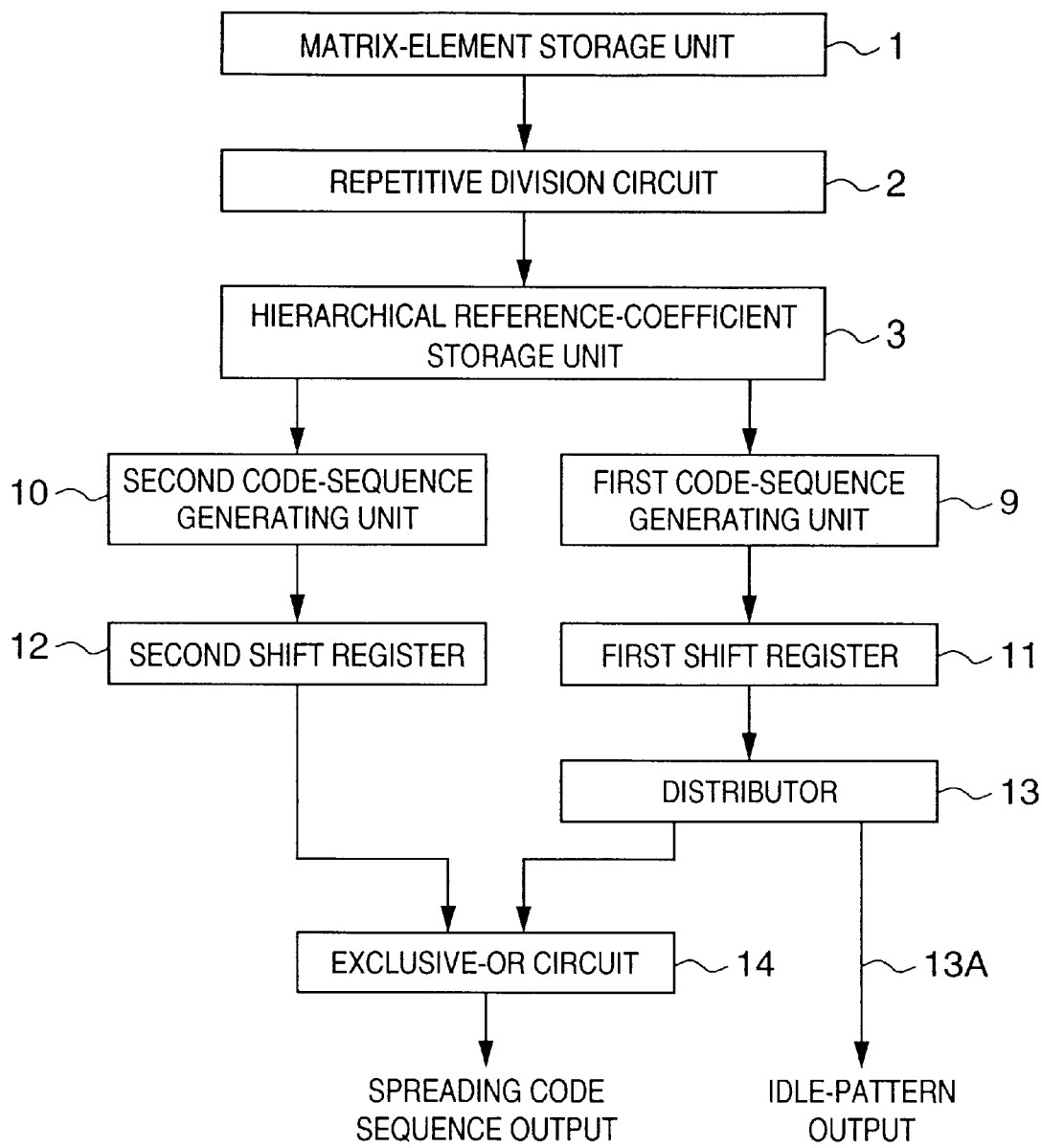

$$C_1 = \begin{bmatrix} C_1(0) \\ C_1(1) \end{bmatrix} = \begin{bmatrix} C_0 & C_0 \\ C_0 & \overline{C_0} \end{bmatrix} = \begin{bmatrix} 1 & 1 \\ 1 & 0 \end{bmatrix}$$

$$C_2 = \begin{bmatrix} C_2(0) \\ C_2(1) \\ C_2(2) \\ C_2(3) \end{bmatrix} = \begin{bmatrix} C_1(0) & C_1(0) \\ C_1(0) & \overline{C_1(0)} \\ C_1(1) & C_1(1) \\ C_1(1) & \overline{C_1(1)} \end{bmatrix} = \begin{bmatrix} 1 & 1 & 1 & 1 \\ 1 & 1 & 0 & 0 \\ 1 & 0 & 1 & 0 \\ 1 & 0 & 0 & 1 \end{bmatrix}$$

$$\vdots$$

$$C_8 = \begin{bmatrix} C_8(0) \\ \vdots \\ C_8(255) \end{bmatrix} = \begin{bmatrix} C_7(0) & C_7(0) \\ C_7(0) & \overline{C_7(0)} \\ \vdots & \vdots \\ C_7(127) & C_7(127) \\ C_7(127) & \overline{C_7(127)} \end{bmatrix}$$

$\overline{C_n}$ INDICATES THE INVERSE OF $C_n$

SPREADING CODE GENERATOR

FIELD OF THE INVENTION

This invention relates to a spreading code generator for generating a spreading code.

BACKGROUND OF THE INVENTION

A spreading code is used in spread-spectrum communication for transmitting an information signal upon spreading the signal over a wide band of frequencies.

In CDMA (Code Division Multiple Access) communication which makes use of different spreading codes, it is possible to acquire multiple communication channels within a common frequency band. As a result, more efficient utilization of frequency can be achieved in comparison with conventional narrow-band communication.

In CDMA communication of this kind, users are identified within the common frequency band owing to the dissimilarity in the spreading codes used. For this reason, so-called orthogonality between spreading codes is necessary in order to prevent interference between users.

In such CDMA communication, transmission rate (transmission speed) can be changed by changing the code length of the spreading code sequence used. However, in a case where multiple users communicate using different transmission rates within the same frequency band, it is required to use spreading codes that are mutually orthogonal even though their periods differ.

In light of the above, a method of performing communication by spreading code sequences having a tree-like hierarchical structure has already been proposed as a CDMA communication scheme having orthogonality between spreading codes. [See Japanese Patent Application Laid-Open No. 10-290211 (which corresponds to EP Disclosure 814581).]

As shown in FIG. 9 illustrative of the prior art mentioned above, matrices $C_n(m)$ (where n represents the order of the matrix and m the row number within the matrix) have a tree-like hierarchical structure. Matrices having the same matrix order n, e.g., matrices $C_2(1)$ and $C_2(2)$ and matrices $C_4(1)$ to $C_4(4)$, are in the same hierarchical layer and the spreading code sequences of the matrices in the identical layers are mutually orthogonal.

On the other hand, among the group of matrices $C_n(m)$ connected in tree-like fashion in the vertical direction, matrices in which the row numbers are odd, e.g., matrices $C_2(1)$, $C_4(1)$, $C_8(1)$ . . . , have code sequences comprising two periods of the higher order component of these matrices. Matrices in which the row numbers are even, e.g., matrices $C_2(2)$, $C_4(2)$, $C_8(2)$ . . . , have code sequences comprising one period of the higher order component of these matrices and an inverted component obtained by inverting the higher order component.

Because the spreading code sequence of a lower order matrix is completely contained within the code sequence of a higher order matrix, the higher and lower order matrices connected in the tree structure do not possess orthogonality even though the code lengths differ. However, even though the code lengths are different, there is orthogonality between matrices not connected in the form of a tree.

For example, matrix $C_2(1)$ and matrix $C_4(1)$ or $C_4(2)$, with are tree-connected, do not possess orthogonality. On the other hand, matrices $C_2(1)$, $C_4(3)$ and $C_4(4)$, which are not tree-connected, do possess orthogonality though the code lengths differ.

As a result, in a case where multiple codes are selected at the time of multiple-rate transmission, assigning codes sequentially upon taking into consideration the relationship between the row numbers m of the matrices makes it possible to perform data communication using mutually orthogonal spreading codes whose periods differ.

In accordance with the prior art described above, a signal is obtained through spread-spectrum modulation of $2^n$ (n>R) channels using a group modulator obtained by hierarchically connecting R stages of basic modulation elements comprising a multiplying element and an adding element.

However, with the above-described spreading code generator, connecting basic modulation elements hierarchically into R stages makes it impossible to avoid an increase in the scale of the circuitry because even the spreading code sequence of maximum code length is accommodated. This invites an increase in the size of the apparatus.

SUMMARY OF THE INVENTION

An object of the present invention is to solve the aforementioned problem.

Another object of the present invention is to reduce the size of the apparatus by simplifying the circuit structure that generates the spreading codes.

A spreading code generator according to the present invention, comprising:

storage means for storing a code; and extending means for repeating inverted extension or non-inverted extension, depending upon a reference coefficient, of the code that has been stored in said storage means.

A spreading code generator according to the present invention comprising:

first storage means for storing a first code;

second storage means for storing a second code; and extending means for repeating inverted extension or non-inverted extension, depending upon a reference coefficient, of the first and second codes stored in said first and second storage means.

A spreading code generating method according to the present invention comprising steps of:

an analyzing step of analyzing a reference coefficient; and a repeating step of repeating inverted extension or non-inverted extension of a code depending upon the reference coefficient.

A transmitting apparatus according to the present invention comprising:

storage means for storing a code;

extending means for repeating inverted extension or non-inverted extension, depending upon a reference coefficient, of the code stored in said storage means; and spreading means for spreading transmission data by the extended code from said extending means.

A transmission apparatus according to the present invention comprising:

first storage means for storing a first code;

second storage means for storing a second code;

a extending means for repeating inverted extension or non-inverted extension, depending upon a reference coefficient, of the first code and second code stored in said first and second storage means; and spreading means for spreading transmission data by an extended code from said extending means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing an example of sequential reference code sequences according to the present invention;

FIG. 3 is a block diagram of a spreading code generator according to a second embodiment of the present invention;

FIG. 5 is a diagram showing an example of a sequential reference code sequence according to the present invention;

DESCRIPTION OF THE PREFERRED EMBODIMENTS

Preferred embodiments of the present invention will now be described in detail with reference to the drawings.

Figure 1:
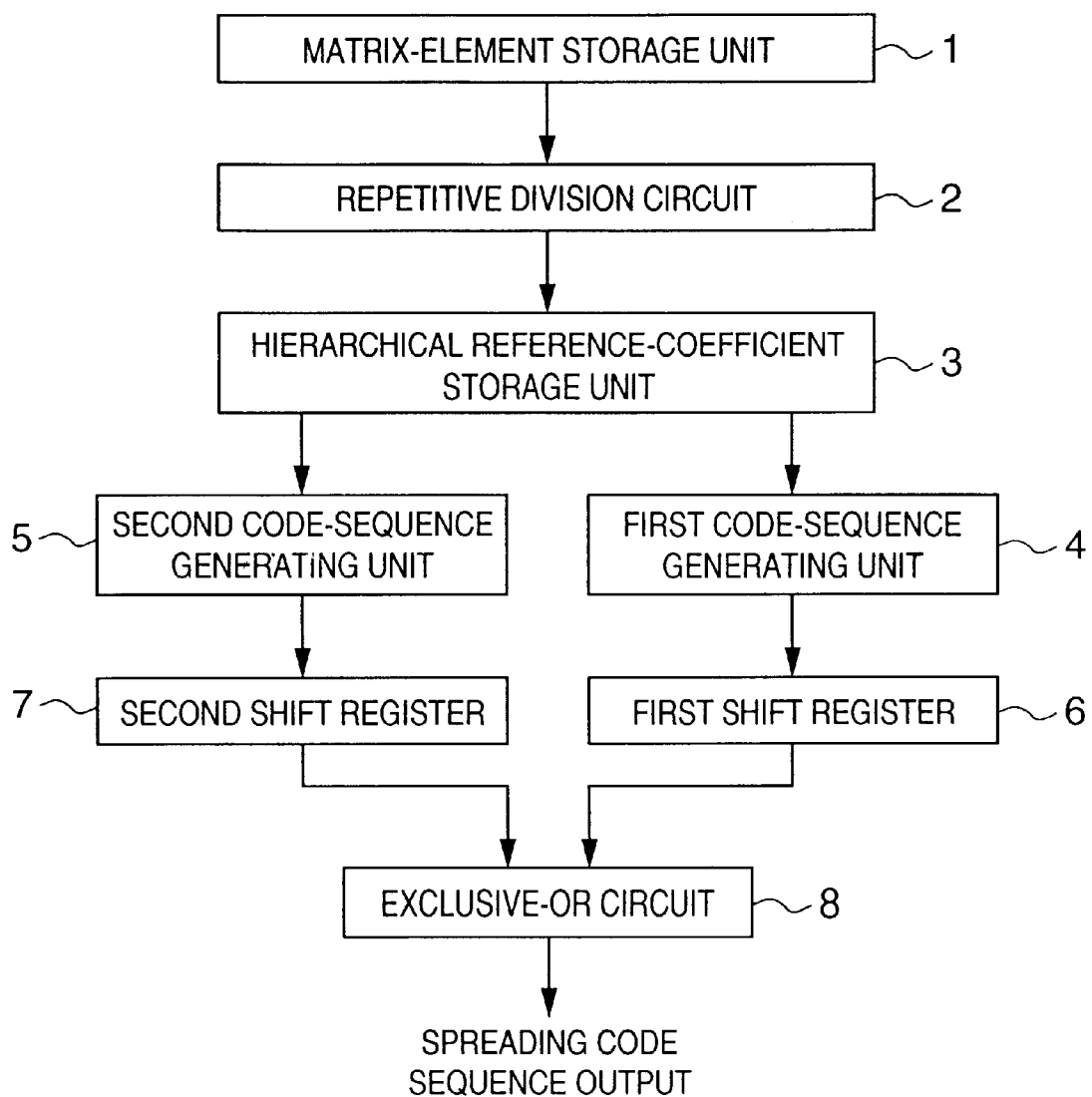
FIG. 1 is a block diagram of a spreading code generator according to a first embodiment of the present invention.

FIG. 1 is a block diagram of a spreading code generator according to a first embodiment of the present invention.

In this embodiment, a general structure of a spreading code generator is described.

The spreading code generator includes a matrix-element storage unit 1 for storing matrix elements of a matrix $C_n(m)$ of a spreading code sequence, i.e., the matrix order n and the row number; a repetitive division circuit 2 for repeatedly subjecting a row number m, which has been read out of the matrix-element storage unit 1, to predetermined division processing a number of times corresponding to the matrix order n; a hierarchical reference-coefficient storage unit 3 for successively storing remainders, which are obtained by division performed by the repetitive division circuit 2, as reference coefficients hierarchically; a first code-sequence generating unit 4 for generating a first code sequence by executing predetermined extension processing based upon reference coefficients from a first reference coefficient to a kth ($1 \ll k \ll n$) reference coefficient among the reference coefficients stored in the hierarchical reference-coefficient storage unit 3; a second code-sequence generating unit 5 for generating a second code sequence by executing predetermined extension processing based upon reference coefficients from a (k+1)th reference coefficient to an nth reference coefficient; a first shift register 6 for successively storing the first code sequence; a second shift register 7 for successively storing the second code sequence; and an exclusive-OR circuit 8 for taking the exclusive-OR between the first and second code sequences output from the first and second shift registers 6, 7 in accordance with a prescribed shift operation (described later), thereby outputting a desired spreading code sequence.

Described next will be a case where spreading code sequences expressed by the group of matrices shown in FIG. 2 are generated.

Figure 9:
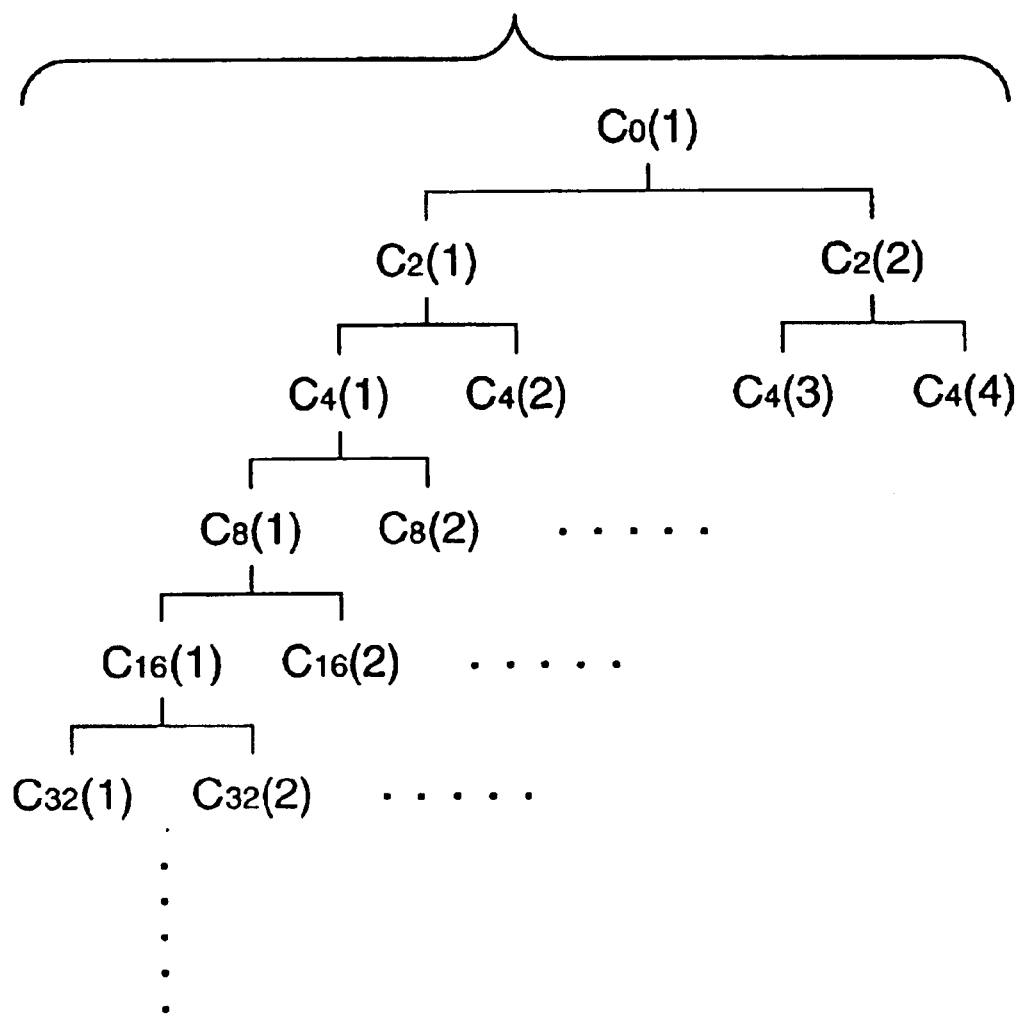
FIG. 9 is a tree-structure diagram illustrating a prior-art example of spreading code sequences.

The spreading code sequences shown in FIG. 2 can be constructed in accordance with a tree structure in the manner shown in FIG. 9.

The matrix order n and the row number m of a target matrix $C_n(m)$ is supplied to the repetitive division circuit 2 from the matrix-element storage unit 1.

The repetitive division circuit 2 sequentially and repeatedly executes a series of division processes, in which the row number m is divided by "2" and the quotient thereof is further divided by "2", a number of times equivalent to the matrix order n, namely n times.

More specifically, if we let $C(n,m)$ [$=C_n(m)$] represent the mth row component of a matrix of order n, then matrices expressed with reference to $C(n,m)$ will be as indicated by Equations (2) and (3) below.

$$(C(n,m)C(n,m))=C$$

$$(n+1,2m) \quad (2)$$

$$(C(n,m)\overline{C}(n,m))=$$

$$C(n+1,2m+1) \quad (3)$$

Accordingly, whether a generated spreading code has been inverted and extended in the manner of Equation (3) or extended without inversion in the manner of Equation (2) can be determined depending upon whether the remainder obtained by dividing the row number m by "2" is "1" or "0". The repetitive division circuit 2 repeats such division processing sequentially a number of times equivalent to the matrix order n, namely n times.

Next, the hierarchical reference-coefficient storage unit 3 sequentially stores the remainders obtained by the repetitive division circuit 2.

Next, the first code-sequence generating unit 4 creates a first code sequence $\{a(1), a(2), a(3), \ldots, a(k-1), a(k)\}$ based upon reference coefficients from the initial value (the first value) to the nth value stored in the hierarchical reference-coefficient storage unit 3, and stores this first code sequence $\{a(1), a(2), a(3), \ldots, a(k-1), a(k)\}$ in the first shift register 6.

Meanwhile, the second code-sequence generating unit 4 creates a second code sequence $\{b(k+1), b(k+2), b(k+3), \ldots, b(n-1), b(n)\}$ based upon reference coefficients from the (k+1)th to the nth reference coefficients stored in the hierarchical reference-coefficient storage unit 3, and stores this second code sequence $\{b(k+1), b(k+2), b(k+3), \ldots, b(n-1), b(n)\}$ in the second shift register 7.

Next, whenever the first shift register 6 is shifted one period, the second shift register 7 is shifted one bit and the exclusive-OR circuit 8 takes the exclusive-OR between the shift register outputs, in the manner shown in Equation (4) below, thereby outputting the desired spreading code sequence.

$$\{a(1) \oplus b(k+1), a(2) \oplus b(k+1), \ldots a(k-1) \oplus b(k+1), a(k) \oplus b(k+1),$$

$$\{a(1) \oplus b(k+2), a(2) \oplus b(k+2), \ldots a(k-1) \oplus b(k+2), a(k) \oplus b(k+2),$$

$$\ldots$$

$$\{a(1) \oplus b(n), a(2) \oplus b(n), \ldots a(k-1) \oplus b(n), a(k) \oplus b(n)\} \quad (4)$$

Thus, in accordance with this embodiment, a register length u necessary for the first shift register 6 and a register length v necessary for the second shift register 7 are represented by Equations (5) and (6), respectively, below.

$$u=2^k \quad (5)$$

$$v=2^{n-k} \quad (6)$$

Further, the exclusive-OR operation is performed based upon iteration every plurality of periods. As a result, if the code length of a spreading code sequence is smaller than the maximum code length m, spreading codes can be generated in the same manner by setting the vacant areas of the registers to all "0"s.

The register lengths u, v of the first and second shift registers 6, 7 and the maximum code length $2^n$ are related as shown in Equation (7).

$$u \times v = 2^n \quad (7)$$

Accordingly, if the register lengths u, v of the first and second shift registers 6, 7 are selected in the manner indicated by Equation (8), the overall length u+v of the shift registers 6, 7 is minimized.

$$u=v=2^{n/2} \quad (8)$$

FIG. 3 is a block diagram according to a second embodiment of the present invention.

In this embodiment, a general structure of a spreading code generator is described.

According to the second embodiment, the matrix order n and row number m corresponding to a target sequential reference code is supplied from the matrix-element storage unit 1 to the repetitive division circuit 2 to calculate reference coefficients sequentially. The calculated reference coefficients are then sent to the hierarchical reference-coefficient storage unit 3.

Next, in a manner similar to that of the first embodiment, the hierarchical reference-coefficient storage unit 3 splits the obtained reference coefficients in two and then sends the k lower order bits and (n−k) higher order bits to first and second code sequence generating units 9, 10, respectively.

The first code sequence generating unit 9 generates a first code and an idle pattern sequence from the lower order reference coefficients among the reference coefficients that have been split in two and stores the first code and the idle pattern sequence in a first shift register 11. Similarly, the second code sequence generating unit 10 generates a second code sequence from the higher order reference coefficients among the reference coefficients that have been split in two and stores the second code sequence in a second shift register 12.

The first shift register 11 shifts and outputs, one bit at a time, the first code and the idle pattern sequence at a desired timing. A distributor 13 distributes the output of the first shift register 11 to an exclusive-OR circuit 14 and to idle-pattern output 13A.

Further, the second shift register 12 is shifted one bit whenever the first shift register 11 is shifted one period, whereby the second code sequence that has been stored in the second shift register 12 is output.

The first code and the idle pattern sequence are output from the distributor 13 as is to the idle-pattern output as an idle pattern and are sent also to the exclusive-OR circuit 14. The latter takes the exclusive-OR between the first code sequence and the second code sequence and outputs the target sequential reference code sequence.

In a case where the idle pattern is transmitted before user data, the idle pattern output 13A is selected and transmitted.

In the second embodiment, the first shift register 11 makes joint use of the first code sequence and idle-pattern sequence. As a result, a separate shift register need not be provided for the idle pattern sequence. This makes possible a further simplification of the circuit arrangement.

Figure 4:
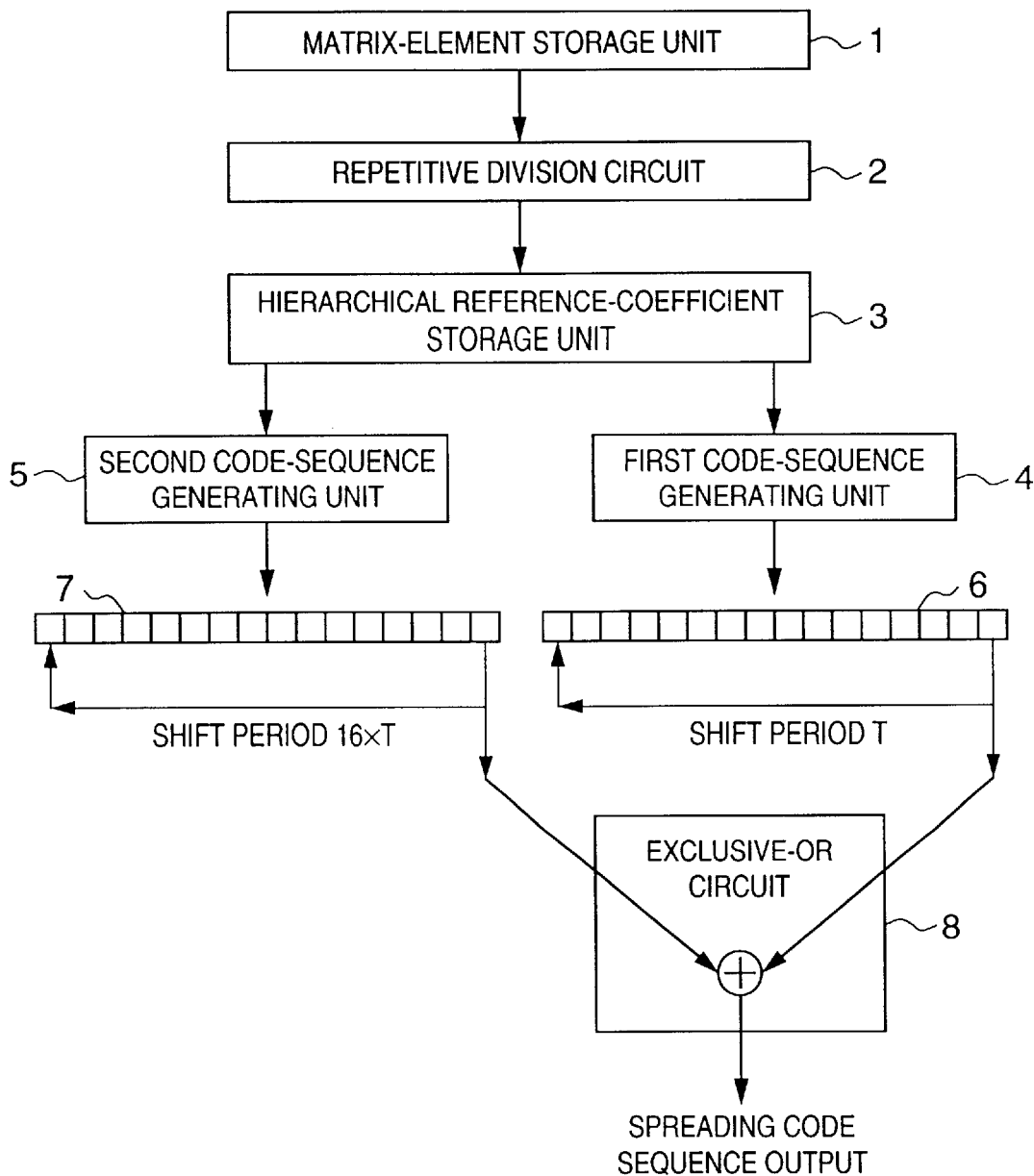
FIG. 4 is a block diagram of a spreading code generator according to a third embodiment of the present invention.

FIG. 4 is a block diagram illustrating a third embodiment of a spreading code generator to which the present invention is applied.

The third embodiment will be described in regard to a case where the maximum code length $2^n$ of a spreading code sequence to be generated is 256, the initial value $C_0(0)$ is "1" and the matrix group $C_n$ constituting all codes is composed of eight matrices $C_1$ to $C_8$, as shown in FIG. 5.

The spreading code sequences shown in FIG. 5 can be constructed in accordance with a tree structure in the manner shown in FIG. 9.

For example, a matrix whose matrix order n is 2 has four ($=2^n$) codes of code length 4 ($=2^n$). The row number m represents the number of the code among the four codes.

In FIG. 4, the matrix order n and row number m corresponding to a target sequential reference code are supplied from the matrix-element storage unit 1 to the repetitive division circuit 2 to calculate an 8-bit hierarchical reference coefficient. The coefficient is then sent to the hierarchical reference-coefficient storage unit 3.

The hierarchical reference-coefficient storage unit 3 splits the obtained reference coefficient into four higher order bits and four lower order bits and then sends these higher and lower order bits to the first and second code sequence generating units 4, 5, respectively.

The first code sequence generating unit 4 generates a first code sequence from the four lower order bits among the obtained reference coefficient and stores the first code sequence in the 16-bit first shift register 6. Similarly, the second code sequence generating unit 5 generates a second code sequence from the four higher order bits among the obtained reference coefficient and stores the second code sequence in the 16-bit second shift register 7.

The first shift register 6 shifts and outputs, one bit at a time, the stored first code sequence at a desired timing. Meanwhile, the second shift register 5 is shifted one bit whenever the first shift register 6 is shifted one period (=16 bits), whereby a prescribed code sequence is output.

The outputs of the two shift registers 6 and 7 are sent to the exclusive-OR circuit 8, which takes the exclusive-OR between these signals and outputs the target sequential reference code sequence.

Figure 6:
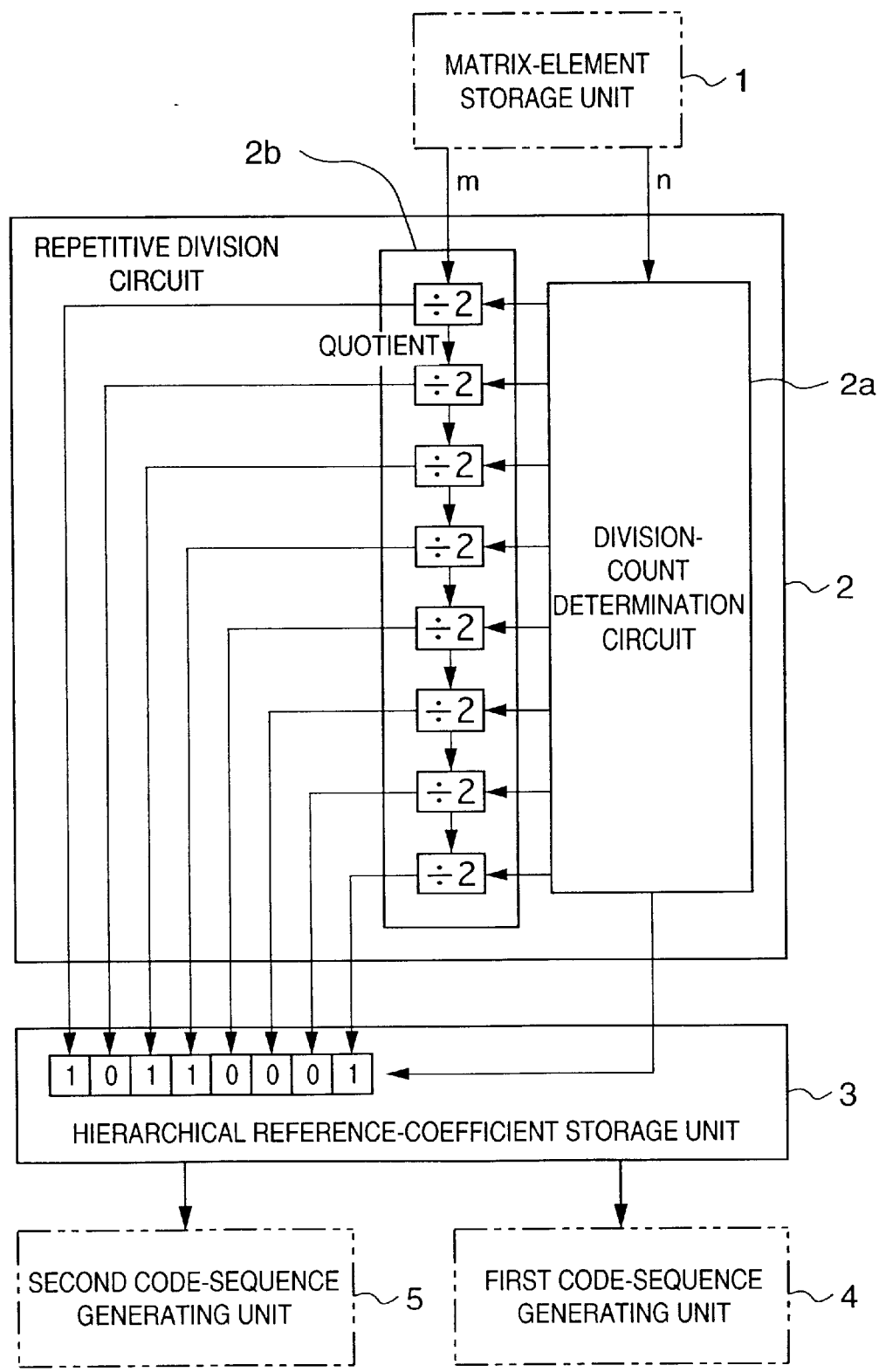
FIG. 6 is a block diagram of a repetitive division circuit according to the third embodiment of the present invention.

FIG. 6 is a diagram showing the internal structure of the repetitive division circuit 2. The latter includes a division-count determination circuit 2a for determining the number of divisions based upon the matrix order n, and a division execution unit 2b for repeatedly dividing the row number m by "2" a number of times equivalent to the matrix order n and calculating the quotient and remainder.

When a matrix order n and row number m corresponding to a target spreading code are supplied from the matrix-element storage unit 1, the division-count determination circuit 2a determines the number of divisions from the matrix order n.

The division execution unit 2b, on the other hand, first divides the row number m by "2" to calculate the quotient and remainder and then divides this quotient further by "2" to calculate the quotient and remainder. The division execution unit 2b repeats this processing sequentially a total of n times.

The remainders obtained are stored successively from the higher order bits of the hierarchical reference-coefficient storage unit 3. For example, if m is 141, division by "2" is repeated eight times and the reference coefficients "10110001" are stored successively in the hierarchical reference-coefficient storage unit 3.

In a case where the number of divisions is less than the maximum value (eight in this instance) of the matrix order n, the division-count determination circuit 2a shifts down the storage area of the hierarchical reference-coefficient storage unit 3 (which is a register) by the amount of the difference, stores the value of the remainder that is the result of the final division in the least significant bit and sets to "0" the higher order bits in the remaining storage area of the shift register.

Thus, a hierarchical reference coefficient that has been stored in the hierarchical reference-coefficient storage unit 3 is split into four lower order and four higher order bits which are then sent to the first code-sequence generating unit 4 and second code-sequence generating unit 5, respectively.

FIGS. 7A–7K are diagrams illustrating the operation of the first and second first code-sequence generating units 4, 5.

The four higher order bits of an 8-bit reference coefficient are sent from the hierarchical reference-coefficient storage unit 3 to the second code-sequence generating unit 5, and the four lower order bits of the 8-bit reference coefficient are sent from the hierarchical reference-coefficient storage unit 3 to the first code-sequence generating unit 4.

Figure 7A:
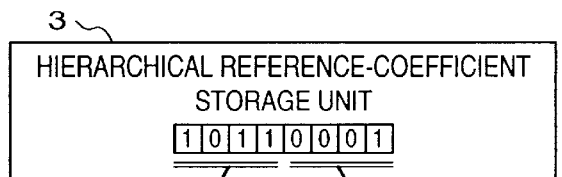
FIGS. 7A–7K are diagrams illustrating the operating states of first and second spreading sequence generation according to the third embodiment of the present invention.
Figure 7B:
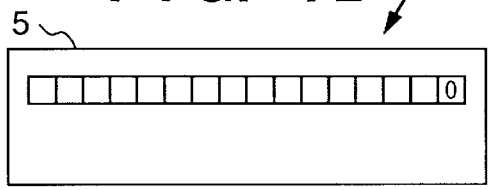
Figure 7G:
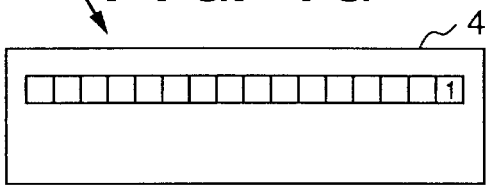

The initial value $C_0$ (=1) of the code has been stored in the least significant bit of the first code-sequence generating unit 4, as shown in FIG. 7G.

Figure 7C:
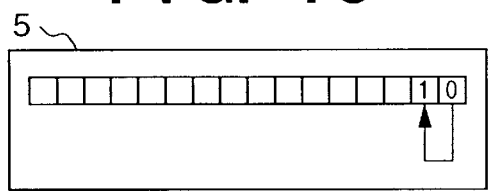
Figure 7H:
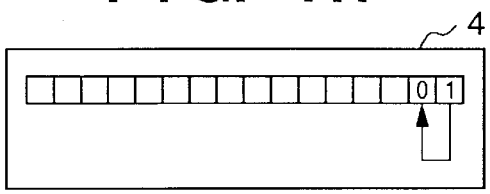
Figure 7D:
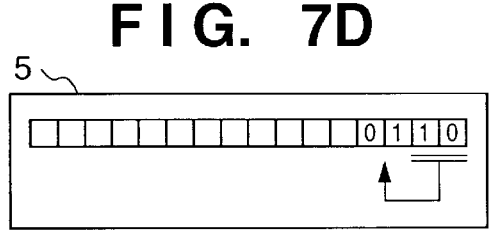
Figure 7I:
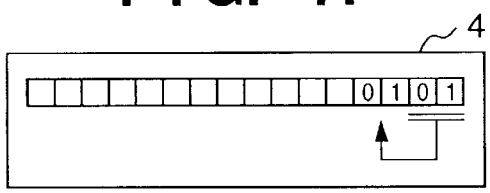
Figure 7E:
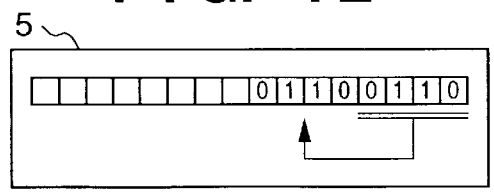
Figure 7J:
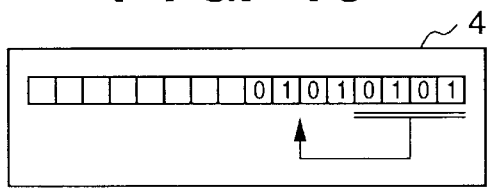
Figure 7F:
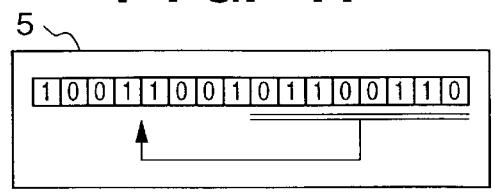
Figure 7K:
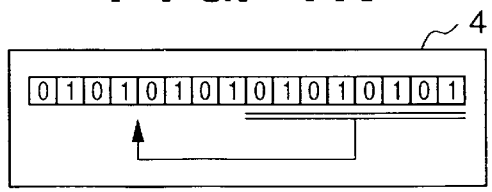

Since the least significant bit of the sent reference coefficient is "1", the first code-sequence generating unit 4 extends the inverse value "0" of the initial value "1" to the second bit, as shown in FIG. 7H. Next, since the value of the second bit of the reference coefficient is "0", the first code-sequence generating unit 4 extends the generated code "01" upward as is to generate a code "0101", as shown in FIG. 7I. Since the value of the third bit of the reference coefficient also is "0", the first code-sequence generating unit 4 extends the generated code "0101" as is to generate a code "01010101", as shown in FIG. 7J. Since the final bit of the reference coefficient also is "0", the first code-sequence generating unit 4 extends the code further to generate the first code sequence "0101010101010101", as shown in FIG. 7K. The first code-sequence generating unit 4 stores the first code sequence thus generated in the first shift register 6.

On the other hand, the initial value "0" of the code has been stored in the least significant bit of the second code-sequence generating unit 5, as shown in FIG. 7B. The reason for this is that when the exclusive-OR is taken between the output of second code-sequence generating unit 5 and the output of the first code-sequence generating unit 4, the output obtained initially will always be a non-inverted output.

Since the least significant bit of the supplied reference coefficient is "1", the second code-sequence generating unit 5 extends the inverse value "1" of the initial value "0" to the second bit, as shown in FIG. 7C. Next, since the value of the second bit of the reference coefficient is "1", the second code-sequence generating unit 5 inverts the generated code "10" and extends it upward to generate a code "0110", as shown in FIG. 7D. Since the value of the third bit of the reference coefficient is "0", the second code-sequence generating unit 5 extends "0110" as is to generate a code "01100110", as shown in FIG. 7E. Since the final bit of the reference coefficient is "1", the second code-sequence generating unit 5 inverts and extends the code to generate the second code sequence "1001100101100110", as shown in FIG. 7F. The second code-sequence generating unit, 5 stores the second code sequence thus generated in the second shift register 7.

Thereafter, the first code sequence that has been stored in the first shift register 6 is output successively to the exclusive-OR circuit 8, while the second code sequence that has been stored in the second shift register 7 is output successively to the exclusive-OR circuit 8 in a form shifted by one bit per period of the first code sequence. The first code sequence and the second code sequence are subjected to an exclusive-OR operation in the exclusive-OR circuit 8, whereby the desired spreading code sequence is generated and output.

Figure 8:
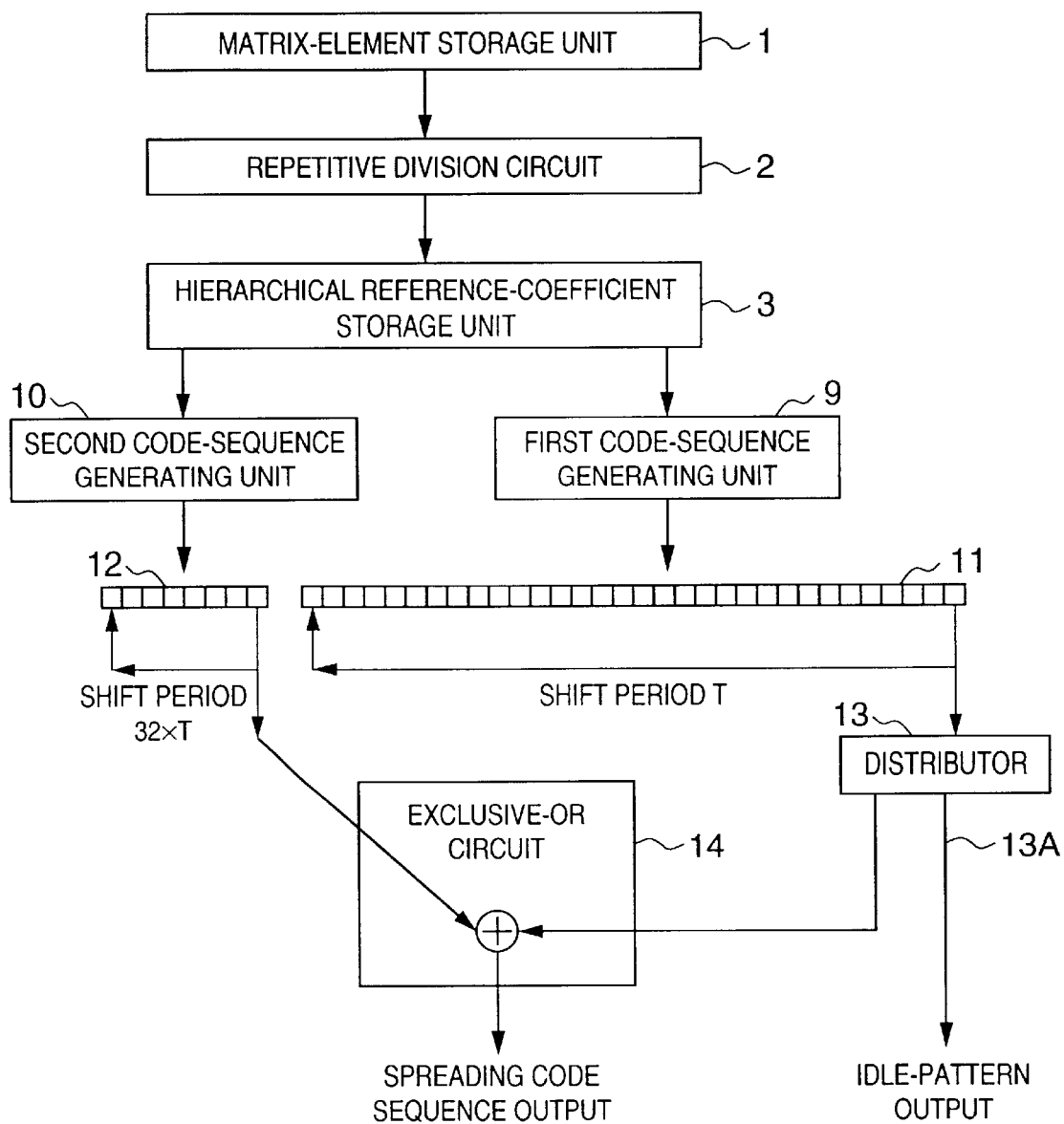
FIG. 8 is a block diagram illustrating a fourth embodiment of the present invention.

FIG. 8 is a block diagram illustrating a fourth embodiment of a spreading code generator to which the present invention is applied.

In the fourth embodiment, the maximum code length $2^n$ of a sequential reference code sequence to be generated is 256 and the initial value $C_0(0)$ of the code is "1", as in the third embodiment, and the matrix group constituting all codes is composed of eight matrices $C_1$ to $C_8$ (see FIG. 5), in a manner similar to that of the first embodiment.

In FIG. 8, the matrix order n and row number m corresponding to a target sequential reference code are supplied from the matrix-element storage unit 1 to the repetitive division circuit 2 to calculate an 8-bit reference coefficient. The coefficient thus calculated is sent to the hierarchical reference-coefficient storage unit 3.

The hierarchical reference-coefficient storage unit 3 splits the obtained reference coefficient into three higher order bits and five lower order bits and then sends these higher and lower order bits to the first and second code sequence generating units 9, 10, respectively.

The first code sequence generating unit 9 generates a first code and an idle pattern sequence from the five lower order bits of the obtained reference coefficient and stores a 32-bit first code and idle pattern sequence in the first shift register 11.

Similarly, the portable information appliance 10 generates a second code sequence from the three higher order bits of the obtained reference coefficient and stores the second code sequence in the 8-bit second shift register 12.

The first code and idle pattern sequence are output from the first shift register 11 while being shifted one bit at a time at a desired timing and are distributed to the exclusive-OR circuit 14 and an idle pattern output 13A by the distributor 13. In a case where the idle pattern sequence is transmitted before user data, the idle pattern output 13A is output as is.

Meanwhile, the first code and the idle pattern sequence are sent to the exclusive-OR circuit 8. Further, the second shift register 12 is shifted one bit whenever the first shift register 11 is shifted by one period (=32 bits), thereby outputting the stored code sequence. The first code and idle pattern sequence from the first shift register 11 and the second code sequence from the second shift register 12 are sent to the exclusive-OR circuit 14, which takes the exclusive-OR between these signals. The target sequential reference code sequence is thus output.

Though the code sequence generator is divided into two units in the foregoing embodiments, it can be divided into three or more units or be made a single unit.

Figure 10:
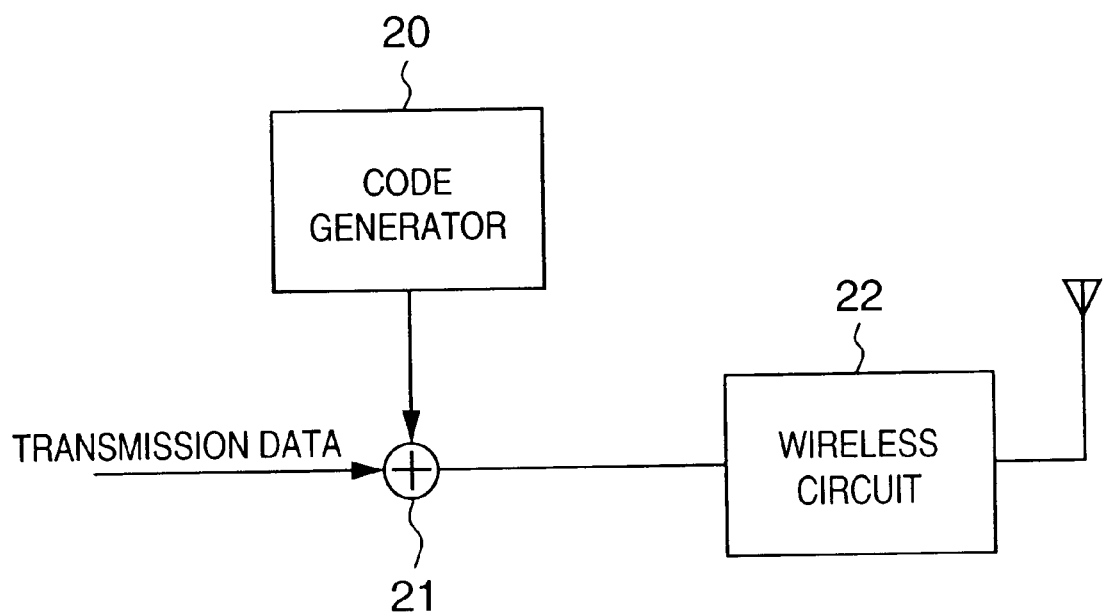
FIG. 10 is a block diagram of a first transmission apparatus having a code generator for implement the present invention.

FIG. 10 is a block diagram of a first transmission apparatus having a code generator 20 for implementing the present invention. The code generator 20 used is any one of the code generators whose structure has been described in connection with FIGS. 1 and 4. A spreading modulator 21 spread-spectrum modulates transmission data by the spreading code sequence output from the code generator 20. A wireless circuit 22 converts the output of the spreading modulator 21 to a wireless signal.

In a case where an idle pattern is to be transmitted, the idle pattern 13A is spread-spectrum modulated as the transmission data instead of user data.

Figure 11:
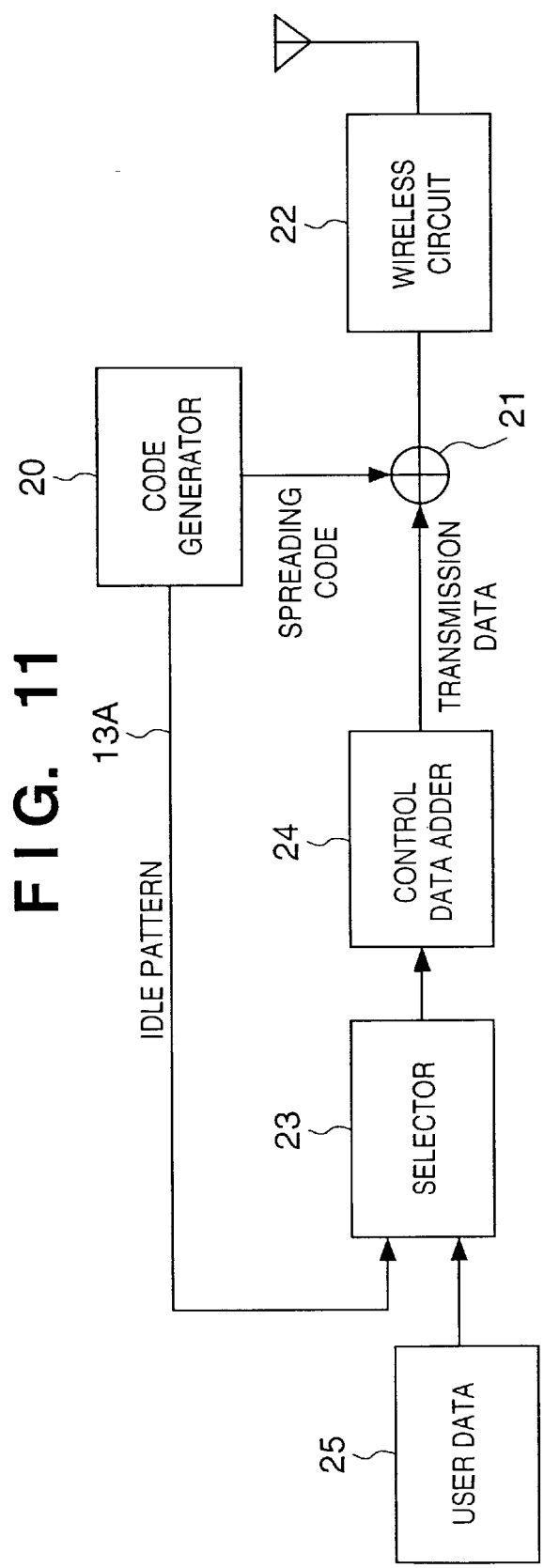
FIG. 11 is a block diagram of a second transmission apparatus having a code generator for implement the present invention.

FIG. 11 is a block diagram of a second transmission apparatus having a code generator 20 for implementing the invention. The code generator 20 used is any one of the code generator whose structure has been described in connection with FIGS. 3 and 8. A selector 23 selects one of the idle pattern 13A and the user data 25. A control data adder 24 adds data for communication control to the selected one of the idle pattern and the user data. The output of the control data adder 24 is spread by the spreading modulator 21 as the transmission data.

As many apparently widely different embodiments of the present invention can be made without departing from the spirit and scope thereof, it is to be understood that the invention is not limited to the specific embodiments thereof except as defined in the appended claims.

What is claimed is:

1. A spreading code generator comprising:

storage means for storing a code;

conversion means for converting, to a reference coefficient, specifying data which specifies one of a plurality of spreading codes, and extending means for repeating inverted extension or non-inverted extension, depending upon the reference coefficient, of the code that has been stored in said storage means.

2. The spreading code generator according to claim 1, wherein said storage means has a first register and a second register, and said extending means repeats inverted extension or non-inverted extension, depending upon the reference coefficient, of a first code stored in said first register, and repeats inverted extension or non-inverted extension, depending upon the reference coefficient, of a second code stored in said second register.

3. The spreading code generator according to claim 1, wherein the specifying data includes data specifying one of a plurality of codes having a common code length.

4. The spreading code generator according to claim 1, wherein the specifying data includes data specifying code length.

5. The spreading code generator according to claim 1, wherein said conversion means has repetitive division means for repeatedly dividing the specifying data by 2.

6. The spreading code generator according to claim 5, wherein the specifying data includes first data for being repetitively divided and second data for specifying the number of times division is to be repeated.

7. A spreading code generator comprising:

storage means for storing a code, said storage means comprising:
a first register for storing a first code; and
a second register for storing a second code; and extending means for repeating inverted extension or non-inverted extension, depending upon a reference coefficient, of the first code stored in said first register to produce an extended first code of k bits, and for repeating inverted extension or non-inverted extension, depending upon the reference coefficient, of the second code stored in said second register to produce an extended second code, wherein said first register stores the extended first code of k bits, and a speed at which the extended first code is read out of said first register is k times a speed at which the extended second code is read out of said second register.

8. The spreading code generator according to claim 7 wherein said extending means has transmitting means for transmitting the extended first code.

9. The spreading code generator according to claim 8 wherein said transmitting means transmits the extended first code as an idle pattern.

10. A spreading code generating method comprising the steps of:

analyzing a reference coefficient, with said analyzing step including converting, into the reference coefficient, specifying data which specifies one of a plurality of spreading codes; and repeating inverted extension or non-inverted extension of a code depending upon the reference coefficient.

11. The spreading code generating method according to claim 10, wherein said repeating step repeats inverted extension or non-inverted extension of a first code and a second code depending upon the reference coefficient.

12. The spreading code generating method according to claim 10, wherein said conversion step includes a division step of repeatedly dividing the specifying data by 2.

13. A spreading code generating method comprising:

an analyzing step of analyzing a reference coefficient; and a repeating step of repeating, depending upon the reference coefficient, inverted extension or non-inverted extension of a first code to produce an extended first code of k bits, and repeating inverted extension or non-inverted extension of a second code to produce an extended second code, wherein said repeating step includes:
a first storage step of storing the extended first code of k bits in a first register; and
a second storage step of storing the extended second code in a second register, and
wherein a speed at which the extended first code is read out of the first register is k times a speed at which the extended second code is read out of the second register.

14. A transmitting apparatus comprising:

storage means for storing a code;

conversion means for converting, to a reference coefficient, specifying data which specifies one of a plurality of spreading codes;

extending means for repeating inverted extension or non-inverted extension, depending upon the reference coefficient, of the code stored in said storage means to produce extended code; and spreading means for spreading transmission data by the extended code from said extending means.

15. The apparatus according to claim 14, wherein said storage means has a first register and a second register, and said extending means repeats inverted extension or non-inverted extension, depending upon the reference coefficient, of a first code stored in said first register, and repeats inverted extension or non-inverted extension, depending upon the reference coefficient, of a second code stored in said second register.

* * * * *

UNITED STATES PATENT AND TRADEMARK OFFICE
CERTIFICATE OF CORRECTION

PATENT NO. : 6,707,841 B1
DATED : March 16, 2004
INVENTOR(S) : Atsushi Takasaki

It is certified that error appears in the above-identified patent and that said Letters Patent is hereby corrected as shown below:

<u>Column 4,</u>
Line 25, "$(C(n,m)C(n,m)) = C(n+1,2m)$" should read -- $(C(n,m)C(n,m)) = C(n+1,2m)$ --.

Signed and Sealed this

Twelfth Day of April, 2005

JON W. DUDAS
*Director of the United States Patent and Trademark Office*